United States Patent
Lin

(10) Patent No.: US 11,244,793 B2
(45) Date of Patent: Feb. 8, 2022

(54) HYBRID ALUMINUM ELECTROLYTIC CAPACITOR AND METHOD OF PRODUCING SAME

(71) Applicant: CAPXON ELECTRONIC(SHEN ZHEN)CO.,LTD, Guangdong (CN)

(72) Inventor: Yizhu Lin, Guangdong (CN)

(73) Assignee: CAPXON ELECTRONIC(SHEN ZHEN)CO., LTD., Shenzhen (CN)

(*) Notice: Subject to any disclaimer, the term of this patent is extended or adjusted under 35 U.S.C. 154(b) by 0 days.

(21) Appl. No.: 16/703,324

(22) Filed: Dec. 4, 2019

(65) Prior Publication Data

US 2020/0111622 A1  Apr. 9, 2020

Related U.S. Application Data

(63) Continuation of application No. PCT/CN2018/109429, filed on Oct. 9, 2018.

(51) Int. Cl.
| | | |
|---|---|---|
| *H01G 11/86* | (2013.01) | |
| *H01G 11/60* | (2013.01) | |
| *H01G 11/04* | (2013.01) | |
| *H01G 11/78* | (2013.01) | |

(52) U.S. Cl.
CPC ............. *H01G 11/86* (2013.01); *H01G 11/04* (2013.01); *H01G 11/60* (2013.01); *H01G 11/78* (2013.01)

(58) Field of Classification Search
CPC ........ H01G 11/04; H01G 11/58; H01G 11/60; H01G 11/62; H01G 11/64; H01G 11/86; H01G 9/045; H01G 11/06; H01G 11/84
See application file for complete search history.

(56) References Cited

U.S. PATENT DOCUMENTS 4,578,204 A * 3/1986 Anderson .............. H01G 9/022
 252/62.2
2009/0147444 A1 6/2009 Takaoka

FOREIGN PATENT DOCUMENTS

| CN | 105374560 A | 3/2016 |
| CN | 106548872 A | 3/2017 |
| CN | 106571232 A | 4/2017 |
| CN | 107103998 A | 8/2017 |

OTHER PUBLICATIONS

Machine Translation of CN 107103998 A, (Nantong Sunion Electronic Co Ltd), 7 pages, Aug. 29, 2017.*

* cited by examiner

*Primary Examiner* — Scott B Geyer

(57) ABSTRACT

Disclosed are a hybrid aluminum electrolytic capacitor and a method of producing the same. The preparation method includes impregnating a capacitive element in a fluid to improve the low-temperature property, where the fluid is prepared from a first organic solvent having a boiling point of 180° C. or more and a melting point of −50° C. or less, a small number of an inorganic or organic acid and an amine having a boiling point of 180° C. or more.

15 Claims, 1 Drawing Sheet

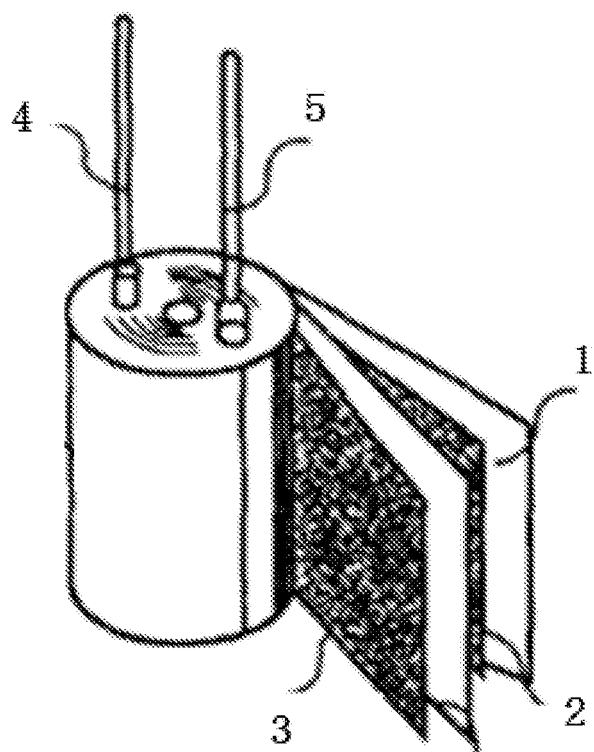

HYBRID ALUMINUM ELECTROLYTIC CAPACITOR AND METHOD OF PRODUCING SAME

CROSS-REFERENCE TO RELATED APPLICATIONS

This application is a continuation of International Patent Application No. PCT/CN2018/109429, filed on Oct. 9, 2018. The contents of the aforementioned applications, including any intervening amendments thereto, are incorporated herein by reference in its entirety.

TECHNICAL FIELD

The present application relates to electrolytic capacitors, and more particularly to a hybrid aluminum electrolytic capacitor and a method of producing the same.

BACKGROUND OF THE INVENTION

Aluminum electrolytic capacitors are widely used in electronic products as basic components, where electrolyte plays a core role in the aluminum electrolytic capacitor, and is closely associated with the service life, reliability and electrification performances of a capacitor, directly affecting the quality of the capacitor. Since the electronic products are continuously improved in quality and the application range of aluminum electrolytic capacitors is continuously broadened, the aluminum electrolytic capacitors are required to have better performance, especially the performances to resist harsh conditions, for example, in the case of an extremely high or low temperature, the aluminum electrolytic capacitors are expected to maintain good equivalent series resistance and impedance, and high reliability.

The existing hybrid capacitors, at a low temperature (e.g., $-55°$ C.), have a large capacitance attenuation, low impedance and equivalent series resistance value, which is probably because that the electrical conductivity of the electrolyte is reduced due to an increase in viscosity at a low temperature.

SUMMARY OF THE INVENTION

A first object of this application is to provide a fluid for improving low-temperature property of a hybrid aluminum electrolytic capacitor to solve the above problems, comprising: an acid, an amine and a first organic solvent, where the amine has a boiling point of 180° C. or more, and the first organic solvent has a boiling point of 180° C. or more and a melting point of $-50°$ C. or less.

In some embodiments, the fluid for improving low-temperature property of the hybrid aluminum electrolytic capacitor further comprises a second organic solvent having a boiling point of 180° C. or more.

In some embodiments, the fluid for improving low-temperature property of the hybrid aluminum electrolytic capacitor further comprises an organic phosphate ester and/or an organic nitrate as an additive, where the additive plays a role in inhibiting gas generation and reducing leakage current, which can improve cycle and storage performances of the hybrid aluminum electrolytic capacitor on the premise that the hybrid aluminum electrolytic capacitor is ensured to have an excellent capacity.

In some embodiments, the additive is 1% or less by weight of the fluid.

In some embodiments, the additive is 0.2-0.5% by weight of the fluid.

In some embodiments, the first organic solvent is 30% or more by weight of the fluid.

In some embodiments, the acid and the amine both have a molality of 0.3 mol/kg or less.

In some embodiments, the acid and the amine are same in equivalent concentration, where the equivalent concentration of the acid refers to a molar concentration of hydrogen ions in the acid, and the equivalent concentration of the amine refers to a molar concentration of hydroxide ions ionized from the amine.

In some embodiments, the first organic solvent is selected from diethylene glycol monobutyl ether, diethylene glycol dibutyl ether, diethylene glycol methyl ether, diethylene glycol monomethyl ether, diethylene glycol monoethyl ether, tripropylene glycol dimethyl ether or ethylene glycol monobutyl ether acetate, or a combination thereof.

In some embodiments, the second organic solvent is selected from diethylene glycol monoethyl ether, triethylene glycol monomethyl ether, propylene carbonate, 4-ethylanisole, 1-methoxy-4-propylbenzene, sulfolane, methylsulfolane, glycerin, thiobenzoic acid, glyceride, N-methylpyrrolidone or N-ethyl-pyrrolidone, or a combination thereof.

In some embodiments, the acid is selected from monochloroacetic acid, oxalic acid, malonic acid, succinic acid, glutaric acid, adipic acid, pimelic acid, suberic acid, azelaic acid, decanoic acid, maleic acid, fumaric acid, phthalic acid, isophthalic acid, terephthalic acid, trimellitic acid, pyromellitic acid, benzoic acid, salicylic acid, mandelic acid, resorcinol, phosphoric acid, phosphorous acid, hypophosphorous acid, boric acid, borofluoric acid, tetrafluoroboric acid, hexafluorophosphoric acid, benzenesulfonic acid or naphthalenesulfonic acid, or a combination thereof.

In some embodiments, the amine is selected from nonyl amine, decyl amine, diethyl amine, triethanol amine, o-Toluidine, ethylene diamine, urotropine or tri-n-butylamine, or a combination thereof.

In some embodiments, the fluid for improving low-temperature property of the hybrid aluminum electrolytic capacitor has an electric conductivity of 0.5 ms/cm or less as well as a pH of 5-7 at 28-32° C.

A second object of the application is to provide a method of preparing a hybrid aluminum electrolytic capacitor, comprising:

(1) producing a capacitive element;

(2) impregnating the capacitive element in a forming solution; and applying a voltage to the capacitive element according to a voltage endurance of an anode foil to repair an oxide film defective portion on a surface of the anode foil of the capacitive element; wherein the oxide film defective portion is formed due to cutting, nailing and winding;

(3) impregnating the capacitive element in a conductive polymer dispersion and drying the impregnated capacitive element to form a conductive polymer layer of a certain thickness on an electrode foil of the capacitive element; and repeating the impregnating and drying to allow the capacitive element to have a capacitance withdrawing rate equal to or more than 85%;

(4) impregnating the capacitive element in a fluid for improving low-temperature property of the hybrid aluminum electrolytic capacitor to cover the surface of the anode foil and an interior of a pit with a dense dielectric oxide film; and (5) assembling and packaging the capacitive element in an aluminum casing. A third object of the application is to provide a hybrid aluminum electrolytic capacitor which is prepared by the method provided above.

The fluid for improving low-temperature property of the hybrid aluminum electrolytic capacitor of this application has good resistance to low temperature, specifically, at an ultra-low temperature, such as −55° C., the capacitance of the hybrid aluminum electrolytic capacitor impregnated with the fluid is only slightly attenuated. Moreover, the impregnation with the fluid facilitates the repairing of the oxide film defective portion of an anode foil, which can further reduce the occurrence of a short circuit. The capacitor prepared herein has a failure mode of open circuit.

BRIEF DESCRIPTIONS OF THE DRAWINGS

FIG. 1 schematically shows a hybrid aluminum electrolytic capacitor according to an embodiment of the invention.

DETAILED DESCRIPTION OF EMBODIMENTS

The technical solutions of the invention will be clearly and completely described below with reference to the embodiments. It is apparent that the embodiments below are merely part of the embodiments of the invention and are not intended to limit the invention. Any other embodiments made by those skilled in the art based on the embodiments disclosed herein without sparing any creative efforts, should fall within the scope of the invention.

Hereinafter, unless otherwise specified, wt % means weight percentage.

The application provides a fluid for improving low-temperature property of a hybrid aluminum electrolytic capacitor to solve the problems mentioned in the last paragraph of the Background, where the fluid includes an acid, a first organic solvent and an amine. In some embodiments, the fluid further includes a second organic solvent and an additive.

The first organic solvent is selected from diethylene glycol monobutyl ether, diethylene glycol dibutyl ether, diethylene glycol methyl ether, diethylene glycol monomethyl ether, diethylene glycol monoethyl ether, tripropylene glycol dimethyl ether or ethylene glycol monobutyl ether acetate, or a combination thereof.

The first organic solvent is 30% or more by weight of the fluid.

The second organic solvent is selected from diethylene glycol monoethyl ether, triethylene glycol monomethyl ether, propylene carbonate, 4-ethylanisole, 1-methoxy-4-propylbenzene, sulfolane, methylsulfolane, glycerin, thiobenzoic acid, glyceride, N-methylpyrrolidone or N-ethylpyrrolidone, or a combination thereof.

The acid is selected from an organic acid, an inorganic acid, or a combination thereof.

The organic acid is selected from monochloroacetic acid, oxalic acid, malonic acid, succinic acid, glutaric acid, adipic acid, pimelic acid, suberic acid, azelaic acid, decanoic acid, maleic acid, fumaric acid, phthalic acid, isophthalic acid, terephthalic acid, trimellitic acid, pyromellitic acid, benzoic acid, salicylic acid, mandelic acid or resorcinol, or a combination thereof.

The inorganic acid is selected from phosphoric acid, phosphorous acid, hypophosphorous acid, alkyl phosphate, boric acid, borofluoric acid, tetrafluoroboric acid, hexafluorophosphoric acid, benzenesulfonic acid or naphthalenesulfonic acid, or a combination thereof.

The amine has a boiling point of 180° C. or more, and is selected from nonyl amine, decyl amine, diethyl amine, triethanol amine, o-Toluidine, ethylene diamine, urotropine or tri-n-butylamine, or a combination thereof.

The acid and the amine both preferably have a molality of 0.3 mol/kg or less, and more preferably have a molality of 0.01-0.25 mol/kg, and the acid and the amine are preferably same in equivalent concentration.

The additive is an organic phosphate ester or an organic nitrate, where the additive is preferably 1% or less by weight of the fluid, and more preferably 0.2-0.5%.

The fluid for improving low-temperature property of the hybrid aluminum electrolytic capacitor of the application has a sparking voltage of 400 V or more, and an electric conductivity of 0.5 mS/cm or less as well as a pH of 5-7 at 28-32° C.

It has been found that the low-temperature property of a capacitor mainly depends on the low-temperature property of the electrolyte in a capacitor. The fluid for improving low-temperature property of the hybrid aluminum electrolytic capacitor disclosed herein is developed based on the existing electrolytes. The capacitor impregnated with the electrolyte prepared herein has a small capacitance attenuation at −55° C.

It should be understood that the fluid for improving low-temperature property of the hybrid aluminum electrolytic capacitor can be prepared according to the above-mentioned components and contents using a common method in the art. Similarly, the fluid of the invention can be adjusted in performances such as viscosity, electrical conductivity, pH value and sparking voltage in a common way in the art. For example, the electrical conductivity and the sparking voltage can be modified by adjusting the ratio of solute to solvent.

The application further provides a method of preparing a hybrid aluminum electrolytic capacitor, which is specifically described below.

Step (100)

An anode foil, a cathode foil and an electrolytic paper are cut to a desired size by a nailing machine. An anode guide pin and a cathode guide pin are respectively riveted to the anode foil and the cathode foil. Then the anode foil, the cathode foil and the electrolytic paper therebetween are coiled together into a shape of a cylinder. Finally, the cylinder is wrapped with a high temperature-resistant insulating tape to form a capacitive element.

Step (200)

The capacitive element is impregnated in a forming solution to repair an oxide film defective portion on a surface of the anode foil of the capacitive element, where the oxide film defective portion is formed due to cutting, nailing and winding.

The repairing of the capacitive element is performed by impregnating the dielectric film defective portions formed at a cross section of the anode foil and formed during the lead bonding and winding with the forming solution such as ammonium dihydrogen phosphate, ammonium borate and ammonium adipate. After the repair, the capacitor is cleaned with pure water and then dried.

The impregnation can be implemented under ultrasonication or under vacuum, where a vacuum degree is controlled at −55 to −85 KPa during the impregnation.

In the application, the capacitor element is generally impregnated under a reduced or increased pressure.

Step (300) The capacitive element is impregnated with a conductive polymer dispersion and dried to ensure that the capacitive element has a capacitance withdrawing rate of 85% or more.

The conductive polymer dispersion can be produced by an existing method. For example, poly(3,4-ethylenedioxythiophene) (PEDOT) is added to pure water to which a polystyrene sulfonic acid (PSS) solution is added under stirring in a water-cooling condition to produce a mixture. Iron (III) sulfate and persulfate, as an oxidizing auxiliary, are added to the mixture to carry out oxidative polymerization, then the reaction mixture is treated by ion-exchange resin and filtration to remove impurities. Finally, the reaction mixture can be dispersed under ultrasonication or high pressure to prepare a stable conductive polymer dispersion having small particles. An average particle size of the conductive polymer (median size d50) is preferably 100 nm or less. Moreover, a solid portion (PEDOT/PSS) of the dispersion is preferably 10% by weight or less, and more preferably 1-5% by weight considering the impregnation and productivity of the capacitor element.

The conductive polymer dispersion can also be prepared as follows. An organic solvent of a high boiling point is introduced to a self-made dispersion or a commercially available dispersion to obtain a mixture, which is further dispersed by high-pressure emulsification, ultrasonic emulsification or high-speed shear emulsification to obtain the conductive polymer dispersion. The organic solvent of a high boiling point is 20% or less by weight of the dispersion, preferably 10% or less by weight, and more preferably 1-5% by weight. The organic solvent of a high boiling point is aqueous and is preferably selected from ethylene glycol (boiling point: 197° C.), diethylene glycol (boiling point: 245° C.), propylene glycol (boiling point: 188° C.), γ-butyrolactone (boiling point: 204° C.), γ-valerolactone (boiling point: 207° C.), N-methylpyrrolidone (boiling point: 202° C.), sulfolane (boiling point: 287° C.), polyethylene glycol (boiling point: 250° C. or more) or polypropylene glycol (boiling point: 280° C. or more), or a combination thereof. The capacitor is hardly affected in capacitance in use even if it is not dried enough.

After impregnated with the dispersion, the capacitive element is dried at a high temperature to form a dense conductive polymer film layer on a surface of the anode and cathode foil of the capacitive element and in the gap between the electrolytic paper. The conductive polymer film has a certain conductivity and high voltage resistance, which can facilitate the reparation of an oxide film defective portion of the anode foil, reducing the occurrence of a short circuit.

The dried capacitive element preferably has a capacitance withdrawing rate of 85% or more, where the capacitance withdrawing rate is defined as a ratio of a capacitance value before the impregnation with the fluid to a capacitance value after the impregnation with the fluid. If the capacitance withdrawing rate is lower than 85%, the capacitor element shows poor equivalent series resistance (ESR) and impedance characteristic (Z) when tested under a frequency of 100 KHz. The capacitive element can be repeatedly impregnated with the conductive polymer dispersion and dried to obtain a capacitance withdrawing rate of 85% or more.

The drying is not particularly limited, and can be completed using a temperature-controlled hot-air drying furnace, where the drying temperature can be 130° C. or more. Since a drying temperature of 200° C. or more will cause oxidative deterioration of the conductive polymer, the drying is preferably performed at 180° C. or less. Considering the productivity, a time of the drying for volatilizing the high-boiling solvent is preferably 2 h or less.

Step (400)

The capacitive element is impregnated with the fluid for improving low-temperature property of the hybrid aluminum electrolytic capacitor.

Step (500)

The capacitive element is assembled and then packaged in an aluminum casing.

The application further provides a hybrid aluminum electrolytic capacitor (as shown in the FIGURE), which is prepared by the above method, where the hybrid aluminum electrolytic capacitor includes an anode guide pin (4), a cathode guide pin (5), an anode foil (3), an electrolytic paper (1) and a cathode foil (2).

It should be understood that the structure of the hybrid aluminum electrolytic capacitor of the application, such as the structure of the capacitive element and the rubber cover, is well known to those skilled in the art, and will not be further described in detail herein. The application can adopt a capacitor with a conventional structure in the art, or with a novel structure.

It should be understood that the hybrid aluminum electrolytic capacitor of the application can be any one of the available aluminum electrolytic capacitors, such as a horn-type aluminum electrolytic capacitor and a bolt-type aluminum electrolytic capacitor, which are well known to those skilled in the art. Given this, the structure and the working principle of the available aluminum electrolytic capacitors will not be described in detail herein.

The hybrid electrolytic capacitor provided herein has a sparking voltage more than 400 V and less capacitance loss at an ultra-low temperature (e.g., −55° C.), and thus it can be widely applied in the field of charging pile module.

In order to make objects, technical solutions and advantages clearer, the invention will be described in detail below with reference to the embodiments. It is apparent that the described embodiments are merely part of the embodiments of the invention, and are not intended to limit the invention. Any other embodiments, made by those skilled in the art based on the embodiments disclosed herein without sparing any creative efforts, should fall within the scope of the application. The capacitors prepared in the following embodiments can be tested for the capacitance loss using a conventional method in the art.

The embodiments of the application are illustratively described below.

Example 1

A hybrid electrolytic capacitor of this Example was prepared by the method mentioned above.

Step (100)

An anode foil, a cathode foil and an electrolytic paper were cut to a desired size by a nailing machine. An anode guide pin and a cathode guide pin were respectively riveted to the anode foil and the cathode foil. Then the anode foil, the cathode foil and the electrolytic paper placed therebetween were coiled into a shape of a cylinder. Finally, the cylinder was wrapped with a high temperature-resistant insulating tape to form a capacitive element.

Step (200)

The capacitive element was repaired by impregnating the capacitive element in a low-pressure forming solution of ammonium adipate and applying a voltage of 92 V and a current density of 3 mA/pcs to the guide pin. After that, the capacitive element was dried in an oven at 125° C. for 60 min.

Step (300)

The capacitive element was impregnated with a conductive polymer dispersion under −65 kPa for 10 min, and dried in the oven at 150° C. for 60 min, where the dispersion included 3 wt % of PEDOT/PSS and 3 wt % of ethylene glycol. Such process was repeated twice. It should be noted that the capacitive element was required to have a capacitance withdrawing rate of 85% or more, and the capacitance withdrawing rate can be improved by repeating such process of impregnation and drying.

Step (400)

The capacitive element was impregnated with a fluid for improving low-temperature property of a hybrid aluminum electrolytic capacitor under −65 kPa for 5 min.

The fluid for improving low-temperature property of the hybrid aluminum electrolytic capacitor of this Example included 97% by weight of a first organic solvent (composed of diethylene glycol dibutyl ether, sulfolane and polyethylene glycol in a weight ratio of 50:29:18), 0.7% by weight of phthalic acid as an acid, 1.5% by weight of triethanol amine as an amine and 0.4% by weight of monobutyl phosphate and 0.4% by weight of nitrobenzoic acid as additives.

The fluid for improving low-temperature property of the hybrid aluminum electrolytic capacitor of this Example had an electrical conductivity of 0.42 ms/cm and a pH of 6.0 when tested at 30° C.

Step (500)

The capacitive element was assembled and packaged in an aluminum casing to obtain a product.

The product was treated at a voltage of 50V and a temperature of 130° C. for 60 min for the aging test.

Comparative Example

The Comparative Example and the Example were basically same in the preparation, and thus the aluminum electrolytic capacitors were same in specifications. The Comparative Example was different from Example 1 in that, in step (400), the aluminum electrolytic capacitor was impregnated with a solution including a mixture of 35% by weight of γ-butyrolactone and 35% by weight of sulfolane and 30% by weight of phthalic acid-1,2,3,4-tetramethylimidazoline dissolved therein, where the solution was used as an electrolyte for a capacitor which had high temperature resistance and long service life. When tested at 30° C., this solution showed an electrical conductivity of 7 mS/cm and a pH of 6.3.

The aluminum electrolytic capacitors of Example 1 and the Comparative Example were tested for low-temperature property, reliability and service life (−55° C./−40° C./−25° C./25° C.), and the results of change rates of capacitance (CAP), loss angle (tan δ) and equivalent series electrical impedance (ESR) were shown in Tables 1-3.

TABLE 1

Change rates of capacitance (CAP) of hybrid aluminum electrolytic capacitors in Comparative Example/Example 1 (the standard of capacitance change rate: ΔC/C ≤ ±20%)

| CAP | Comparative Example CAP (μF) 120 Hz | | | | Example 1 CAP (μF) 120 Hz | | | |
|---|---|---|---|---|---|---|---|---|
| | −55° C. | −40° C. | −25° C | 25° C. | −55° C. | −40° C. | −25° C. | 25° C. |
| 1 | 79.08 | 106.06 | 118.52 | 121.99 | 98.86 | 113.58 | 119.73 | 122.91 |
| 2 | 79.06 | 105.31 | 119.78 | 123.27 | 98.38 | 113.22 | 120.27 | 123.20 |
| 3 | 78.03 | 105.13 | 118.62 | 122.19 | 98.77 | 113.65 | 119.81 | 122.78 |
| 4 | 79.05 | 105.78 | 119.08 | 122.62 | 98.00 | 112.35 | 118.61 | 121.78 |
| ΔC/C (%) 1 | −35.18 | −13.06 | −2.64 | 0.00 | −19.57 | −7.59 | −2.59 | 0.00 |
| ΔC/C (%) 2 | −35.86 | −14.57 | −2.86 | 0.00 | −20.15 | −8.10 | −2.38 | 0.00 |
| ΔC/C (%) 3 | −36.14 | −13.96 | −2.92 | 0.00 | −19.56 | −7.44 | −2.42 | 0.00 |
| ΔC/C (%) 4 | −35.53 | −13.73 | −2.89 | 0.00 | −19.53 | −7.74 | −2.55 | 0.00 |
| AVG | −35.68 | −13.83 | −2.88 | 0.00 | −19.70 | −7.72 | −2.48 | 0.00 |

TABLE 2

Change rates of loss angle of hybrid aluminum electrolytic capacitors in Comparative Example and Example 1

| DF | Comparative Example DF (%) 120 Hz | | | | Example 1 DF (%) 120 Hz | | | |
|---|---|---|---|---|---|---|---|---|
| | −55° C. | −40° C. | −25° C. | 25° C. | −55° C. | −40° C. | −25° C. | 25° C. |
| 1 | 6.56 | 4.52 | 2.31 | 1.67 | 2.95 | 2.60 | 1.74 | 1.74 |
| 2 | 6.63 | 4.23 | 2.45 | 1.16 | 3.07 | 2.51 | 1.67 | 1.62 |
| 3 | 6.60 | 4.12 | 2.40 | 1.66 | 2.86 | 2.70 | 1.73 | 1.66 |
| 4 | 6.53 | 4.62 | 2.41 | 1.67 | 2.70 | 2.86 | 1.83 | 1.81 |
| AVG | 6.58 | 4.37 | 2.39 | 1.54 | 2.90 | 2.67 | 1.74 | 1.71 |

TABLE 3

Change rates of equivalent series resistance of hybrid aluminum electrolytic capacitors in Comparative Example and Example

| ESR | Comparative Example ESR (mΩ) 100 KHz | | | | Example ESR (mΩ) 100 KHz | | | |
|---|---|---|---|---|---|---|---|---|
| | −55° C. | −40° C. | −25° C. | 25° C. | −55° C. | −40° C. | −25° C. | 25° C. |
| 1 | 20.56 | 16.67 | 13.85 | 12.58 | 15.22 | 14.58 | 14.22 | 12.77 |
| 2 | 20.32 | 17.32 | 14.36 | 13.12 | 14.53 | 14.29 | 14.54 | 12.62 |
| 3 | 19.63 | 17.25 | 14.52 | 12.25 | 14.23 | 14.78 | 14.35 | 12.13 |
| 4 | 20.28 | 17.88 | 14.68 | 13.32 | 14.39 | 14.16 | 14.00 | 12.52 |
| AVG | 20.20 | 17.28 | 14.35 | 12.82 | 14.59 | 14.45 | 14.28 | 12.51 |

In the Comparative Example, the aluminum electrolytic capacitor was impregnated with the electrolyte which was resistant to high temperature and had long service life. Because this electrolyte at a low temperature had a reduced electrical conductivity caused by an increase in viscosity, the aluminum electrolytic capacitor impregnated therein had a larger attenuation in capacitance (CAP) and a larger increase in loss angle (tan δ) and equivalent series resistance (ESR) at a low temperature of −55° C./−40° C., which indicated that the corresponding aluminum electrolytic capacitor had poor low-temperature property.

However, the aluminum electrolytic capacitor in Example 1 impregnated with a fluid for improving low-temperature property of a hybrid aluminum electrolytic capacitor showed a smaller change rate in the capacitance (CAP), loss angle (tan δ) and equivalent series resistance (ESR) at a low temperature of −55° C./−40° C. because of the presence of an organic solvent with a high boiling point and a low melting point and an amine having a boiling point of 180° C. or more in the fluid. Such results indicated that after impregnated with the fluid provided herein for improving low-temperature property, the aluminum electrolytic capacitor had a small capacitance (CAP) attenuation at an extremely low temperature, even at −55° C., and the fluid also had an ability to repair an oxide film defective portion of an anode foil.

Described above are merely preferred embodiments of the application, and are not intended to limit the application. Various modifications, replacements, improvements and changes made by those skilled in the art without departing from the spirit of the application should fall within the scope of the application.

What is claimed is:

1. A fluid for improving low-temperature property of a hybrid aluminum electrolytic capacitor, comprising an acid, an amine, and a first organic solvent;
   wherein the amine has a boiling point of 180° C. or more; and the first organic solvent has a boiling point of 180° C. or more and a melting point of −50° C. or less; and the acid and the amine both have a molality of 0.3 mol/kg or less.

2. The fluid of claim 1, further comprising a second organic solvent having a boiling point of 180° C. or more.

3. The fluid of claim 1, wherein the first organic solvent is 30% or more by weight of the fluid.

4. The fluid of claim 2, wherein the first organic solvent is selected from diethylene glycol monobutyl ether, diethylene glycol dibutyl ether, diethylene glycol methyl ether, diethylene glycol monomethyl ether, diethylene glycol monoethyl ether, tripropylene glycol dimethyl ether or ethylene glycol monobutyl ether acetate, or a combination thereof; and
   the second organic solvent is selected from diethylene glycol monoethyl ether, triethylene glycol monomethyl ether, propylene carbonate, 4-ethylanisole, 1-methoxy-4-propylbenzene, sulfolane, methyl sulfolane, glycerin, thiobenzoic acid, glyceride, N-methylpyrrolidone or N-ethyl-pyrrolidone, or a combination thereof.

5. The fluid of claim 1, wherein the acid is selected from monochloroacetic acid, oxalic acid, malonic acid, succinic acid, glutaric acid, adipic acid, pimelic acid, suberic acid, azelaic acid, decanoic acid, maleic acid, fumaric acid, phthalic acid, isophthalic acid, terephthalic acid, trimellitic acid, pyromellitic acid, benzoic acid, salicylic acid, mandelic acid, resorcinol, phosphoric acid, phosphorous acid, hypophosphorous acid, boric acid, borofluoric acid, tetrafluoroboric acid, hexafluorophosphoric acid, benzenesulfonic acid or naphthalene sulfonic acid, or a combination thereof; and
   the amine is selected from nonyl amine, decyl amine, diethyl amine, triethanolamine, o-Toluidine, ethylenediamine, urotropin or tri-n-butylamine, or a combination thereof.

6. A fluid for improving low-temperature property of a hybrid aluminum electrolytic capacitor, comprising an acid, an amine, and a first organic solvent;
   wherein the amine has a boiling point of 180° C. or more; and the first organic solvent has a boiling point of 180° C. or more and a melting point of −50° C. or less; and
   wherein the acid and the amine are same in equivalent concentration.

7. A fluid for improving low-temperature property of a hybrid aluminum electrolytic capacitor, comprising an acid, an amine, and a first organic solvent;
   wherein the amine has a boiling point of 180° C. or more; and the first organic solvent has a boiling point of 180° C. or more and a melting point of −50° C. or less; and
   wherein the fluid has a conductivity of 0.5 ms/cm or less and a pH of 5-7 at 28-32° C.

8. A method of preparing a hybrid aluminum electrolytic capacitor, comprising:
   (1) producing a capacitive element;
   (2) impregnating the capacitive element in a forming solution; and applying a voltage to the capacitive element according to a voltage endurance of an anode foil to repair an oxide film defective portion on a surface of the anode foil of the capacitive element; wherein the oxide film defective portion is formed due to cutting, nailing and winding;
   (3) impregnating the capacitive element in a conductive polymer dispersion and drying the impregnated capacitive element to form a conductive polymer layer of a certain thickness on an electrode foil of the capacitive element; and repeating the impregnating and drying to allow the capacitive element to have a capacitance withdrawing rate equal to or more than 85%;

(4) impregnating the capacitive element in the fluid of claim 1 to cover the surface of the anode foil and an interior of a pit with a dense dielectric oxide film; and (5) assembling and packaging the capacitive element in an aluminum casing.

9. The method of claim 8, wherein the fluid further comprises a second organic solvent having a boiling point of 180° C. or more.

10. The method of claim 9, wherein the first organic solvent is 30% or more by weight of the fluid.

11. The method of claim 8, wherein the acid and the amine are same in equivalent concentration.

12. The method of claim 8, wherein the first organic solvent is selected from diethylene glycol monobutyl ether, diethylene glycol dibutyl ether, diethylene glycol methyl ether, diethylene glycol monomethyl ether, diethylene glycol monoethyl ether, tripropylene glycol dimethyl ether or ethylene glycol monobutyl ether acetate, or a combination thereof; and the second organic solvent is selected from diethylene glycol monoethyl ether, triethylene glycol monomethyl ether, propylene carbonate, 4-ethylanisole, 1-methoxy-4-propylbenzene, sulfolane, methyl sulfolane, glycerin, thiobenzoic acid, glyceride, N-methylpyrrolidone or N-ethyl-pyrrolidone, or a combination thereof.

13. The method of claim 8, wherein the acid is selected from monochloroacetic acid, oxalic acid, malonic acid, succinic acid, glutaric acid, adipic acid, pimelic acid, suberic acid, azelaic acid, decanoic acid, maleic acid, fumaric acid, phthalic acid, isophthalic acid, terephthalic acid, trimellitic acid, pyromellitic acid, benzoic acid, salicylic acid, mandelic acid, resorcinol, phosphoric acid, phosphorous acid, hypophosphorous acid, boric acid, borofluoric acid, tetrafluoroboric acid, hexafluorophosphoric acid, benzenesulfonic acid or naphthalene sulfonic acid, or a combination thereof; and the amine is selected from nonyl amine, decyl amine, diethyl amine, triethanolamine, o-Toluidine, ethylenediamine, urotropin or tri-n-butylamine, or a combination thereof.

14. The method of claim 8, wherein the fluid has a conductivity of 0.5 ms/cm or less and a pH of 5-7 at 28-32° C.

15. A hybrid aluminum electrolytic capacitor, the hybrid aluminum electrolytic capacitor being prepared by the method of claim 8.

* * * * *